(12) United States Patent
Ijaz et al.

(10) Patent No.: US 11,917,600 B2
(45) Date of Patent: *Feb. 27, 2024

(54) COMMUNICATION SYSTEM

(71) Applicant: NEC Corporation, Tokyo (JP)

(72) Inventors: Ayesha Ijaz, Tokyo (JP); Yassin Aden Awad, Tokyo (JP); Robert Arnott, Tokyo (JP)

(73) Assignee: NEC CORPORATION, Tokyo (JP)

( * ) Notice: Subject to any disclaimer, the term of this patent is extended or adjusted under 35 U.S.C. 154(b) by 22 days.

This patent is subject to a terminal disclaimer.

(21) Appl. No.: 17/708,229

(22) Filed: Mar. 30, 2022

(65) Prior Publication Data

US 2022/0240251 A1 Jul. 28, 2022

Related U.S. Application Data

(63) Continuation of application No. 16/763,874, filed as application No. PCT/JP2018/040396 on Oct. 30, 2018, now Pat. No. 11,330,587.

(30) Foreign Application Priority Data

Nov. 16, 2017 (GB) ...................................... 1718999
Jan. 10, 2018 (GB) ...................................... 1800393

(51) Int. Cl.
*H04W 4/00* (2018.01)
*H04W 72/0453* (2023.01)
*H04L 1/1812* (2023.01)
*H04W 72/21* (2023.01)

(52) U.S. Cl.
CPC ....... *H04W 72/0453* (2013.01); *H04L 1/1812* (2013.01); *H04W 72/21* (2023.01); *H04W 74/0833* (2013.01)

(58) Field of Classification Search
CPC ......... H04W 72/0406; H04W 72/0413; H04W 72/0453; H04W 74/0833
See application file for complete search history.

(56) References Cited

U.S. PATENT DOCUMENTS

| | | | |
|---|---|---|---|
| 5,896,449 A * | 4/1999 | Oshidari | H04M 3/40 379/406.02 |
| 11,063,652 B2 | 7/2021 | Xiong | H04J 13/0074 |

OTHER PUBLICATIONS

"NGMN 5G White Paper" by NGMN Alliance, V1.0, Feb. 17, 2015, pp. 1-125.

(Continued)

*Primary Examiner* — Bo Hui A Zhu

(57) ABSTRACT

A communication system is disclosed in which a base station communicates with user equipment via an associated cell having a system bandwidth. The system bandwidth comprises a bandwidth part having a set of contiguous physical resource blocks. The base station initiates a random access procedure with the user equipment; provides first information identifying a set of frequency resources for an uplink channel; and provides second information identifying at least one specific frequency resource, within said set of frequency resources, for said uplink communication. The first information is provided prior to completion of the random access procedure.

8 Claims, 6 Drawing Sheets

(56) References Cited

OTHER PUBLICATIONS

"3rd Generation Partnership Project: Technical Specification Group Services and System Aspects; Study on Architecture for Next Generation System (Release 14)". 3GPP TR 23.799, V14.0.0, Dec. 2018, pp. 1-522.
"Resource Allocation for PUCCH transmission", Samsung, 3GPP TSG RAN WG1 Meeting 90bis, R1- 1717655, Oct. 9-13, 2017, pp. 1-4.
"Discussion on resource allocation for uplink control channel", Panasonic, 3GPP TSG RAN WG1 Meeting #90bis, R1-1718260, Oct. 9-13, 2017, pp. 1-3.
International Search Report for PCT/JP2018/040396 dated Jan. 18, 2019 [PCT/ISA/210].
Written Opinion for PCT/JP2018/040396 dated Jan. 18, 2019 [PCT/ISA/237].
Japanese Office Action for JP Application No. 2020-526653 dated May 25, 2021 with English Translation.
NEC, "Resource allocation for NR PUCCH", 3GPP TSG RAN WG1 Meeting 91, R1-1720380, Nov. 18, 2017. USA.
NEC, "PUCCH resource allocation prior to RRC configuration", 3GPP TSG RAN WG1 Meeting AM1801, R-1800538, Jan. 12, 2018, Canada.
CN Office Action for CN Application No. 201880073645.4, dated Dec. 26, 2022 with English Translation.
Intel Corporation, "Resource allocation for PUCCH", 3GPP tsg_ran/WG1_RL1, R1-1717389, Oct. 2017, pp. 1-6.
Oppo, "Summary of contributions for PUCCH resource allocation", 3GPP tsg_ran/WG1_RL1, Oct. 2017, R1-1718787, pp. 1-8.
JP Office Action for JP Application No. 2022-161578, dated Jul. 4, 2023 with English Translation.
ZTE, Sanechips, "NR PUCCH resource allocation", 3GPP TSG RAN WG1 adhoc_NR_AH_1709 R1-1715527, Sep. 2017.
United States Office Action for U.S. Appl. No. 16/763,874 dated Sep. 2, 2021.
United States Notice of Allowance for U.S. Appl. No. 16/763,874 dated Jan. 21, 2022.

\* cited by examiner

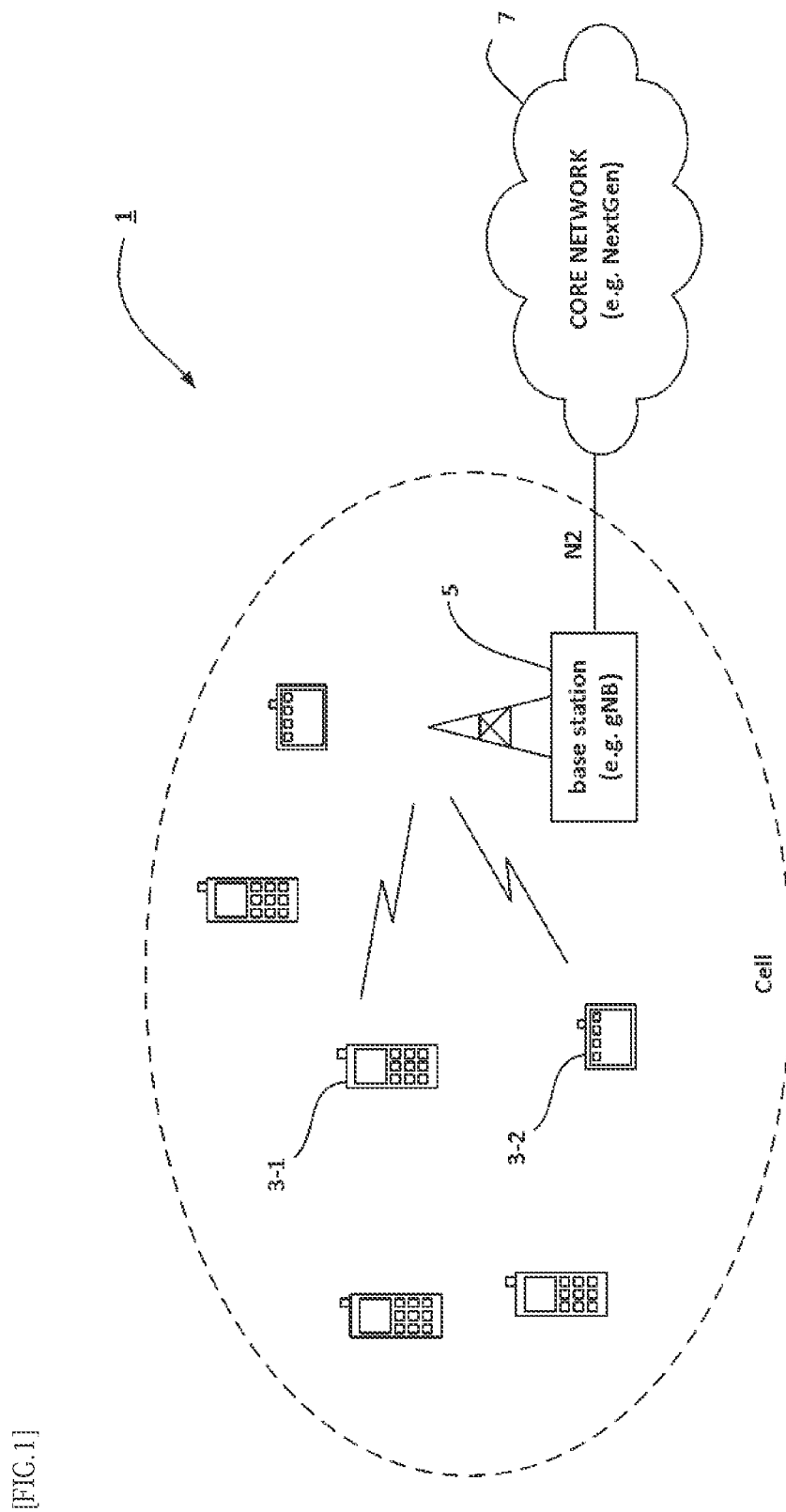
[FIG. 1]

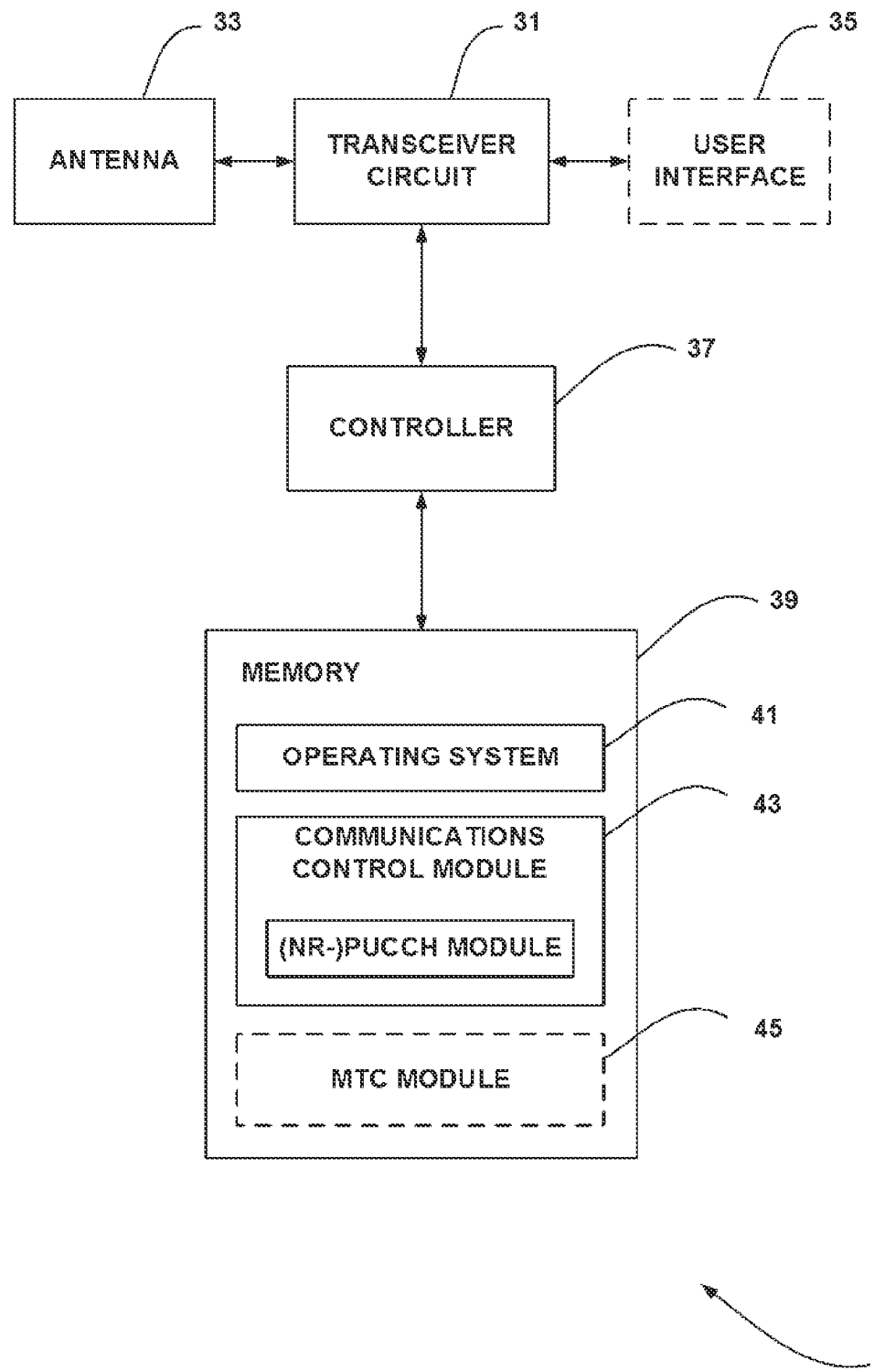
[FIG.2]

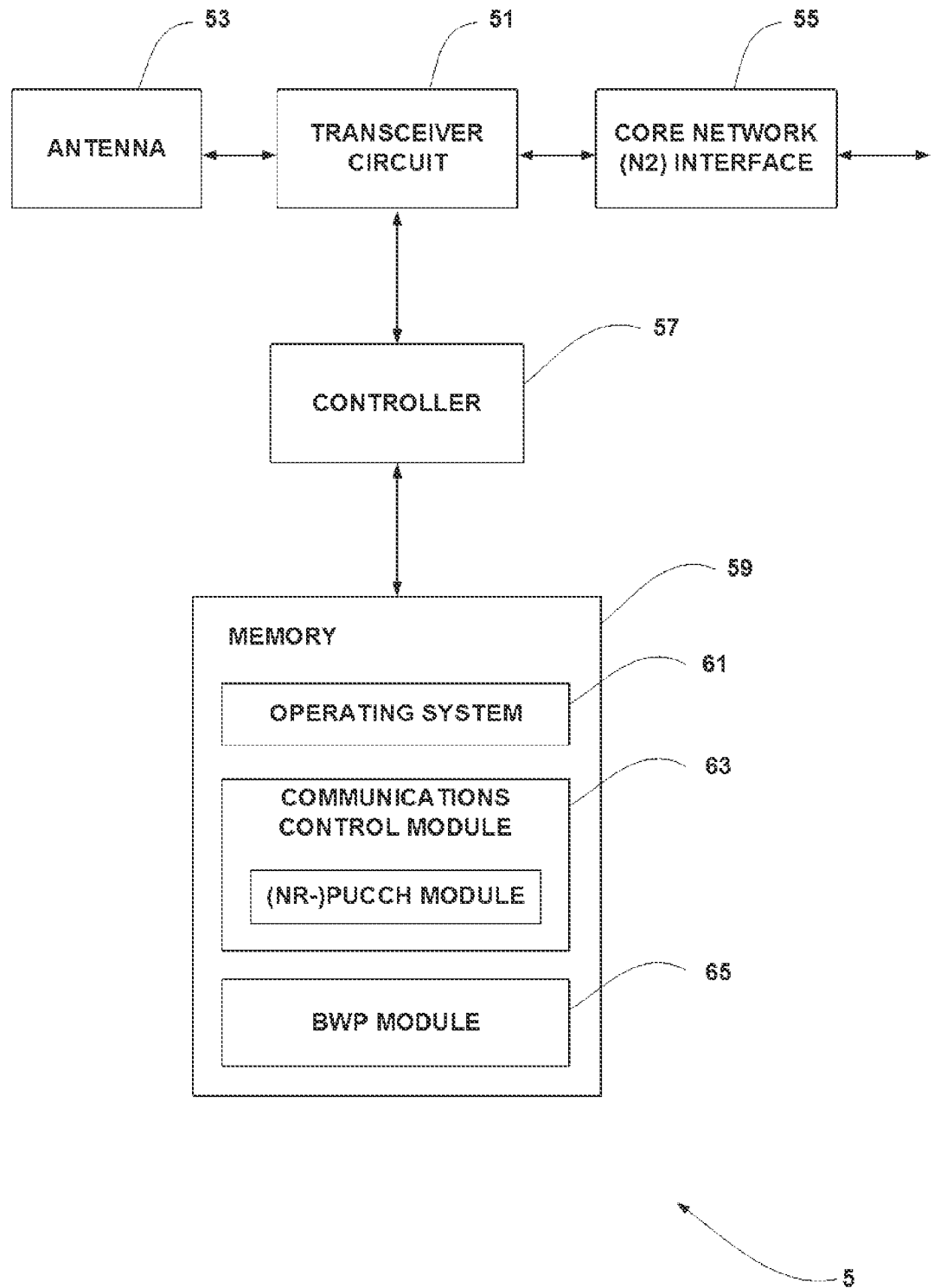
[FIG.3]

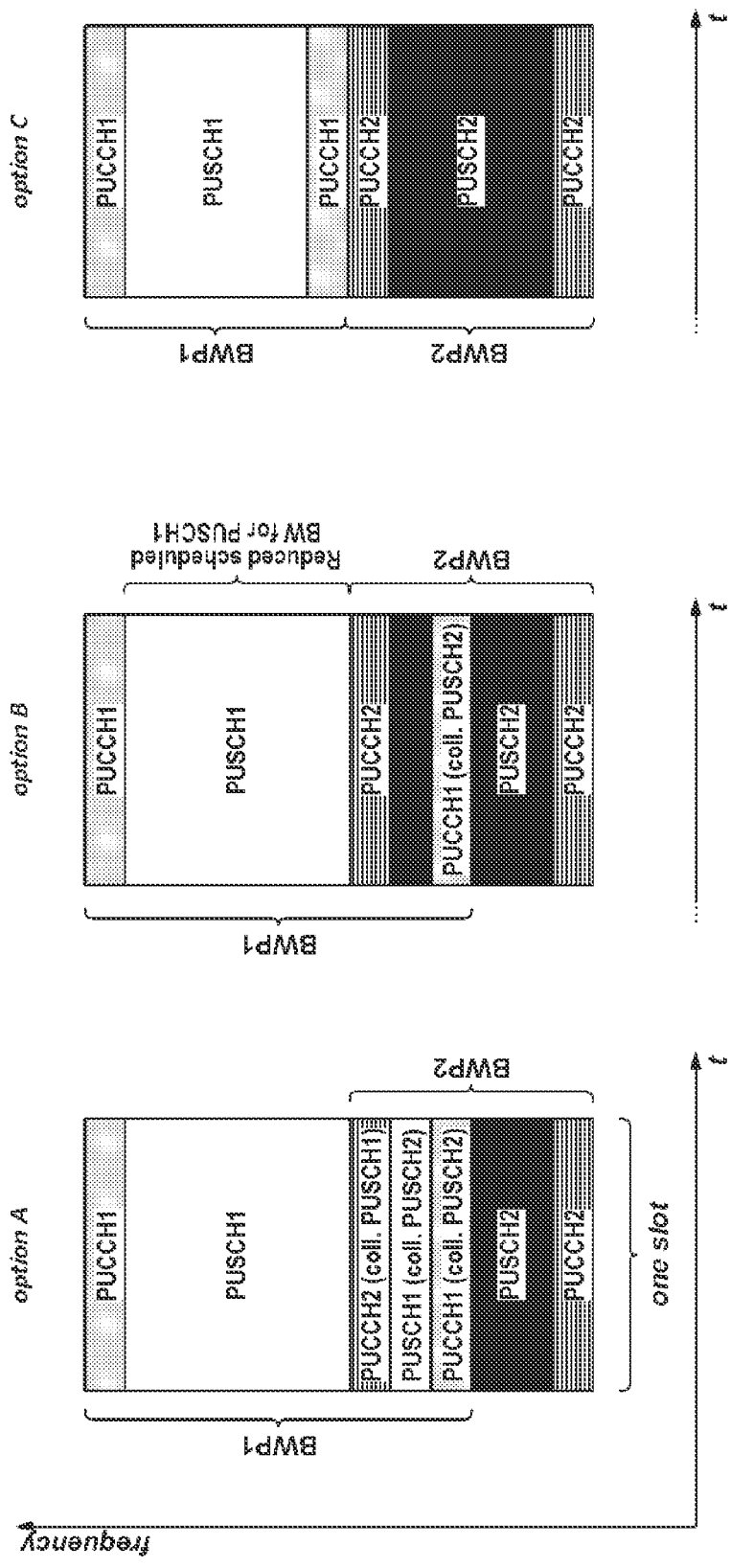
[FIG. 4]

[FIG.5]
Exemplary provision of sub-bands within a particular BWP
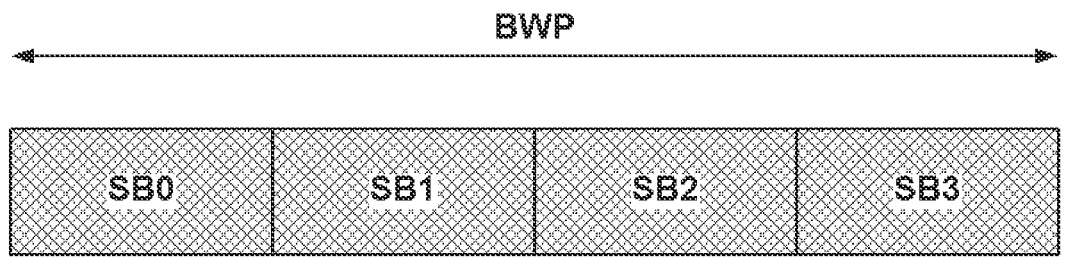

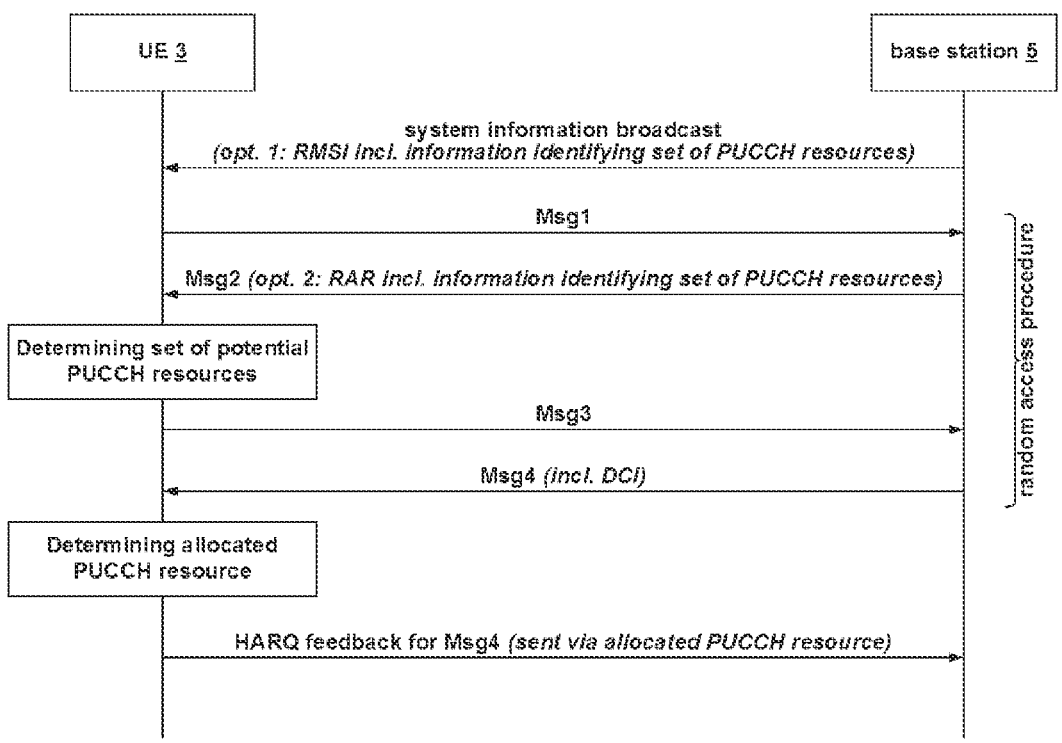
[FIG.6]

COMMUNICATION SYSTEM

CROSS-REFERENCE TO RELATED APPLICATIONS

The present application is a continuation application of U.S. patent application Ser. No. 16/763,874 filed on May 13, 2020, which is a National Stage Entry of international application PCT/JP2018/040396 filed on Oct. 30, 2018, which claims the benefit of priority from United Kingdom Patent Application No. GB1718999.4 filed on Nov. 16, 2017 and United Kingdom Patent Application No. GB1800393.9 filed on Jan. 10, 2018, the disclosures of all of which are incorporated in their entirety by reference herein.

TECHNICAL FIELD

The present invention relates to a communication system. The invention has particular but not exclusive relevance to wireless communication systems and devices thereof operating according to the 3rd Generation Partnership Project (3GPP) standards or equivalents or derivatives thereof. The invention has particular although not exclusive relevance to the provision of control channels and resource allocation in the so-called 'Next Generation' systems.

BACKGROUND ART

The latest developments of the 3GPP standards are referred to as the Long Term Evolution (LTE) of Evolved Packet Core (EPC) network and Evolved UMTS Terrestrial Radio Access Network (E-UTRAN), also commonly referred as '4G'. In addition, the term '5G' and 'new radio' (NR) refer to an evolving communication technology that is expected to support a variety of applications and services. Various details of 5G networks are described in, for example, the 'NGMN 5G White Paper' V1.0 by the Next Generation Mobile Networks (NGMN) Alliance, which document is available from https://www.ngmn.org/5g-white-paper.html. 3GPP intends to support 5G by way of the so-called 3GPP Next Generation (NextGen) radio access network (RAN) and the 3GPP NextGen core network. 3GPP Technical Specification (TS) 23.799 V14.0.0 describes the overall architecture and general procedures for NextGen (5G) systems planned for Release 14 of the 3GPP standards. 3GPP also studied the potential use of frequency bands up to 100 GHz for new (5G) radio access networks.

Under the 3GPP standards, a NodeB (or an eNB in LTE, gNB in 5G) is the base station via which communication devices (user equipment or 'UE') connect to a core network and communicate to other communication devices or remote servers. For simplicity, the present application will use the term base station to refer to any such base stations and use the term mobile device or UE to refer to any such communication device. The core network (i.e. the EPC in case of LTE) hosts functionality for subscriber management, mobility management, charging, security, and call/session management (amongst others), and provides connection for communication devices to external networks, such as the Internet.

Communication devices might be, for example, mobile communication devices such as mobile telephones, smartphones, user equipment, personal digital assistants, laptop/tablet computers, web browsers, e-book readers and/or the like. Such mobile (or even generally stationary) devices are typically operated by a user, although it is also possible to connect so-called 'Internet of Things' (IoT) devices and similar machine-type communication (MTC) devices to the network. For simplicity, the present application refers to mobile devices (or UEs) in the description but it will be appreciated that the technology described can be implemented on any communication devices (mobile and/or generally stationary) that can connect to a communications network for sending/receiving data, regardless of whether such communication devices are controlled by human input or software instructions stored in memory.

Recent developments in telecommunications have seen a large increase in the use of MTC devices which are networked devices arranged to communicate and perform actions without human assistance. Examples of such devices include smart meters, which can be configured to perform measurements and relay these measurements to other devices via a telecommunication network. The standards relating to MTC devices provide support for a reduced bandwidth of 1.4 MHz in downlink and uplink. Thus, some MTC devices (referred to as 'reduced bandwidth MTC devices') may support only a limited bandwidth (typically 1.4 MHz) compared to the total system bandwidth and/or they may have fewer/simplified components. This allows such 'reduced bandwidth' MTC devices to be made more economically compared to MTC devices supporting a larger bandwidth and/or having more complicated components. It will be appreciated that other types of MTC devices and/or UEs may support a different bandwidth that is smaller than the system bandwidth used in some cells (even though the bandwidth supported by these devices may be larger than 1.4 MHz).

In order to be able to communicate via the base stations, communication devices need to monitor control channels operated by the base stations. Physical control channels are transmitted on an aggregation of one or several consecutive control channel elements (CCEs). One of these physical control channels, the so-called physical downlink control channel (PDCCH) carries the scheduling of downlink assignments and related control information to individual communication devices. The so-called physical uplink control channel (PUCCH) carries, from the communication device to the serving base station, a set of information referred to as the Uplink Control Information (UCI). The UCI includes, amongst others, the so-called Hybrid Automatic Repeat Request (HARQ) feedback which is generated by the communication device and sent to the serving base station in response to downlink data transmissions received from the base station. The UCI may also include channel quality indication (COI), although this is optional. It will be appreciated that in NextGen systems the physical uplink control channel may also be referred to as NR-PUCCH.

In LTE, depending on the specific configuration applied in the cell, the PUCCH region normally occupies the opposing edges of the system bandwidth in order to support 'slot hopping' (slot hopping is a technique for improving frequency diversity by frequently alternating the location of the PUCCH physical resources between opposite edges of the cell bandwidth, which may be beneficial to improving signal reception at the UEs). However, this existing (LTE-specific) design cannot be easily reused in 5G NR systems because different UEs (e.g. MTC devices) designed for different application scenarios may be equipped with transceivers supporting different operating bandwidths, which operating bandwidth may in some cases be smaller than the system bandwidth. Accordingly, whilst most UEs are expected to support simultaneous reception over the entire system bandwidth (which may be up to 1 GHz in NR), some UEs (such as MTC devices) with a relatively limited bandwidth (compared to the system bandwidth in a given cell) would be unable to successfully receive all the PUCCH data sent near the edges of the system bandwidth.

In order to address this issue, there are ongoing discussions in 3GPP regarding PUCCH resource allocations for bandwidth parts and a new PUCCH design for NR. In this context, the term 'bandwidth part' (BWP) refers to a (contiguous) portion of the system bandwidth having substantially the same bandwidth as (or smaller than) the radio frequency bandwidth supported by a particular UE (or group of UEs). The provision of BWP may be particularly beneficial to for example MTC devices and/or the like having a smaller operational bandwidth than the system bandwidth in a given cell. It will be appreciated that a (e.g. UE specific) PUCCH region may be provided near the edges of a given BWP, i.e. within the radio frequency bandwidth supported by the UEs using that BWP. 3GPP agreed that, in order to support reduced UE bandwidth capability within a wideband carrier, in each serving cell where PUCCH is configured, each configured UL BWP includes associated PUCCH resources. 3GPP also foresees that a downlink (or uplink) BWP configured for a given UE in its serving cell may overlap in frequency domain with another configured downlink (or uplink) BWP in that cell.

However, allocation of a PUCCH region near the edges of the radio frequency bandwidth supported by the UEs (as opposed to a PUCCH region near the edges of the system bandwidth) may potentially result in a fragmented utilization of the frequency spectrum available to the base station and disrupt contiguous uplink transmissions (since the PUCCH region for some UEs would need to be provided at a location other than near the edges of the system bandwidth, resulting in a fragmentation of the portion of the system bandwidth that may be used for data transmissions). It will also be appreciated that when more than one BWP is provided in a cell, the channels of a particular BWP may (at least partially) overlap with one or more channels of a different BWP which may result in a collision between these channels. For example, collision may occur between the PUCCH for a first BWP and the so-called physical uplink shared channel (PUSCH) for a second BWP.

FIG. 4 illustrates schematically some of the options and potential problems for the provision of BWP specific PUCCH in NR systems. Specifically, 'option A' shows that simply reusing the existing LTE design for PUCCH resource allocation in each UL BWP may cause PUSCH and/or PUCCH collision over the overlapping BWPs (denoted 'BWP1' and 'BWP2' in FIG. 4) in the frequency domain in the same slot(s). PUSCH1/PUCCH1 and PUSCH2/PUCCH2 indicate PUSCH/PUCCH of BWP1 and BPW2, respectively. Alternatively, as shown in 'option B', the base station may be configured to handle the PUSCH collision of the two BWPs by scheduling a reduced bandwidth for the PUSCH of one of the two overlapping BWPs (e.g. for a BWP with relaxed PUSCH error rate requirement). However, even in this case the channel 'PUCCH1' still collides with PUSCH2', thereby, fragmenting the resources of BWP2. Such fragmentation can be avoided only if it is possible to configure the corresponding PUCCH1 resources in a region above PUCCH2. However, this option is likely to complicate system design and hinder the adoption of a unified solution for PUCCH resource configuration and indication. This can be avoided by minimizing overlapping of UL BWPs in the same slot from network perspective, for example as illustrated in 'option C' of FIG. 4.

Table 6 illustrates a set of parameters and their possible value ranges for PUCCH resource allocation for different PUCCH formats. 3GPP foresees that, in order to identify its associated PUCCH resources, each UE knows in which slot(s) the PUCCH is transmitted by the base station. 3GPP agreed that in NR systems a set of PUCCH resources may be configured via high layer signaling (from the base station to the UE), and a PUCCH resource within the configured set is indicated by DCI. It was also agreed that an appropriate PUCCH resource determination rule will be defined at least for the case where its dedicated PUCCH resources are unknown to the UE (however, the details of such PUCCH resource determination rule are for further study, including whether implicit resource mapping and/or explicit signaling is to be used).

Thus, it is expected that a set of PUCCH resources may be configured for the UE via higher layer signaling (e.g. radio resource control (RRC) signaling) and the particular PUCCH resource, within the configured set, for the transmission of hybrid automatic repeat request (hybrid ARQ or HARQ) feedback ('HARQ-ACK') may be dynamically indicated to the UE by DCI. However, prior to completion of the RRC configuration, the set of PUCCH resources is not known at the UE side. For example, the UE already needs to provide HARQ-ACK feedback for the last message ('Msg4') of the 4-step random access procedure. However, this message is received before the completion of the RRC configuration, i.e. before the base station is able to perform higher layer signaling for the UE and before it is able to configure a set of PUCCH resources for that UE, as foreseen by 3GPP. Although a number of different explicit and implicit approaches have been proposed to allow UEs to transmit the HARQ-ACK on the allocated PUCCH resource, there is no agreement in 3GPP yet regarding how to address the issue of PUCCH resource allocation in NR when BWP is employed.

SUMMARY OF INVENTION

Accordingly, preferred example embodiments of the present invention aim to provide alternative methods and apparatus which may be used to address the above issues whilst ensuring efficiency and flexibility, and that allow the UE to determine the particular PUCCH resource that the UE is expected to use.

Although for efficiency of understanding for those of skill in the art, the invention will be described in detail in the context of a 3GPP system (5G networks), the principles of the invention can be applied to other systems.

In one example aspect, the invention provides a method performed by user equipment (UE) of identifying a frequency resource for an uplink communication, the method including: initiating a random access procedure; obtaining first information identifying a set of frequency resources for an uplink channel; obtaining second information identifying at least one specific frequency resource, within said set of frequency resources, for said uplink communication; and identifying based on said first information and said second information said frequency resource for said uplink communication; wherein said first information is obtained prior to completion of the random access procedure.

In another example aspect, the invention provides a method performed by a base station of identifying a frequency resource for an uplink communication by user equipment, the method including: initiating a random access procedure with the user equipment; providing first information identifying a set of frequency resources for an uplink channel; and providing second information identifying at least one specific frequency resource, within said set of frequency resources, for said uplink communication; wherein said first information is provided prior to completion of the random access procedure.

Example aspects of the invention extend to corresponding apparatus, systems, and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently of (or in combination with) any other disclosed and/or illustrated features. In particular but without limitation the features of any of the claims dependent from a particular independent claim may be introduced into that independent claim in any combination or individually.

BRIEF DESCRIPTION OF DRAWINGS

Example embodiments of the invention will now be described, by way of example, with reference to the accompanying drawings in which:

FIG. 1 illustrates schematically a cellular telecommunication system to which example embodiments of the invention may be applied;

FIG. 2 is a schematic block diagram of a mobile device forming part of the system shown in FIG. 1;

FIG. 3 is a schematic block diagram of a base station forming part of the system shown in FIG. 1;

FIG. 4 illustrates schematically some of the options that may be used for providing control channels within bandwidth parts forming part of a system bandwidth of the base station shown in FIG. 1;

FIG. 5 illustrates schematically some exemplary sub-bands within a bandwidth part of the system bandwidth of the base station shown in FIG. 1; and FIG. 6 is an exemplary signaling (timing) diagram schematically illustrating a method performed by components of the system shown in FIG. 1.

DESCRIPTION OF EMBODIMENTS

<Overview>

FIG. 1 schematically illustrates a (cellular) telecommunications network 1 in which user equipment 3 (mobile telephones and/or other mobile devices) can communicate with each other via base stations 5 (e.g. a 'gNB' in NR networks) using an appropriate radio access technology (RAT). It will be appreciated that in 5G systems base stations are also referred to as including one or more transmit receive points (TRPs). As those skilled in the art will appreciate, whilst six mobile device 3 and one base station 5 are shown in FIG. 1 for illustration purposes, the system, when implemented, will typically include other base stations and mobile devices.

Each base station 5 operates one or more associated cells either via a TRP located at the base station (and/or one or more remotely located TRPs). In this example, for simplicity, the base station 5 operates a single cell having an associated system bandwidth. The base station 5 is connected to a core network 7 (e.g. via an appropriate gateway and/or user-plane/control function) and neighboring base stations are also connected to each other (either directly or via an appropriate base station gateway). The core network 7 may include, amongst others, a control plane manager entity and a user plane manager entity, one or more gateways (GWs) for providing a connection between the base stations 5 and other networks (such as the Internet) and/or servers hosted outside the core network.

Each mobile device 3 connects to an appropriate cell (depending on its location and possibly on other factors, e.g. signal conditions, subscription data, capability, and/or the like) by establishing a radio resource control (RRC) connection with the base station 5 operating that cell. In order to establish such an RRC connection, a mobile device 3 is required to carry out a so-called random access procedure with the base station 5, which procedure typically includes four messages (referred to as 'Msg1' to 'Msg4'). The mobile device 3 and base stations 5 (and other transmission points in the network) communicate over an appropriate air interface which depends on the RAT used. The mobile devices 3 communicate with core network nodes using so-called non-access stratum (NAS) signaling, which is relayed between the mobile device 3 and the appropriate core network node by the base station 5/TRP serving the mobile device 3.

Some of the mobile devices 3-1 may include conventional user equipment, such as mobile telephones (smartphones and/or the like) that are equipped with appropriate transceiver circuitry capable of communicating over a relatively large bandwidth, e.g. the entire system bandwidth of the cell of the base station 5. Other mobile devices 3-2 (such as MTC devices and/or the like) may be equipped with transceiver circuitry supporting simultaneous communications over a relatively small bandwidth, e.g. a bandwidth that is smaller than the system bandwidth of the cell of the base station 5.

In order to support both types of mobile devices 3-1 and 3-2 (and potentially other types of UEs as well), the base station 5 in this example allocates one or more bandwidth parts (BWPs) within the system bandwidth, each BWP being configured to support a particular operating bandwidth (that is smaller than the system bandwidth but in any case not exceeding the system bandwidth). From the perspective of the base station 5, it may be beneficial to minimize frequency domain overlapping of UL BWPs in the same slot in order to avoid the need for a complicated scheduler algorithm design and PUCCH resource configuration and indication mechanism.

Moreover, the base station 5 is configured to indicate an appropriate (UE specific) PUCCH resource for each mobile device 3 in such a way that the mobile device 3 is able to determine its allocated PUCCH resource even without having an established RRC connection with the base station 5.

In more detail, the base station 5 may employ either an explicit or an implicit mechanism (or both) to indicate the allocation of a PUCCH resource within a given BWP.

If the base station 5 uses an explicit indication, the base station 5 may be configured to broadcast appropriate information (via the so-called remaining minimum system information and/or the like), indicating the set of (UE specific) PUCCH resources. The base station 5 may be further configured to indicate, to a given mobile device 3, the particular resource (e.g. a single resource from the set of potential PUCCH resources) to be used for the PUCCH transmission. For example, the base station 5 may use an appropriate field in the DCI scheduling of 'Msg4' (the fourth, final message of the random access procedure). Accordingly, it is possible to indicate the PUCCH resource allocation to the mobile device prior to completion of the RRC connection establishment with the base station 5.

It will be appreciated that, instead of broadcasting the explicit indication, the base station 5 may be configured to indicate the set of PUCCH resources in an appropriately formatted random access response (i.e. 'Msg2' preceding 'Msg4').

If the base station 5 uses an implicit indication of a set of (potential) PUCCH resources, the applicable (UE specific) PUCCH resource may be determined by the mobile device 3 based on an appropriate cell specific parameter (e.g. $N_{pucch1}$) broadcast via the so-called remaining minimum system information (RMSI). In this case the PUCCH resource for Msg4 may be derived based on an appropriate formula known to the mobile device 3, for example the formula Npucch1+$n_{CCE\_Index}$ (where $n_{CCE\_Index}$ denotes the first index associated with the control channel element (CCE) of the PDCCH that schedules Msg4).

Beneficially, a combination of explicit indication and implicit determination may be used for dynamically signaling PUCCH resources, which may result in a reduced overhead (compared to other methods). If the base station 5 if configured to follow this method, the allocated PUCCH resource ($n_{PUCCH,RI}$) may be derived using the following formula:

$$n_{PUCCH,RI} = i_{SB\_index,BWP} \cdot N_{PRB,SB} \cdot N_{cyclic\_shifts,PRB} + n_{CCE\_index}$$ [Math. 1]

where $i_{SB\_index,BWP}$ is the sub-band index indicated via RMSI; $N_{PRB,SB}$ is the number of PRBs in each SB; $N_{cyclic\_shifts,PRB}$ is a fixed number of cyclic shifts (e.g. 4, 6, 8, or 12) within a PRB.

In another example, the allocated PUCCH resource ($n_{PUCCH,RI}$) for Msg4 HARQ-ACK feedback transmission may be derived using the formula:

$$n_{PUCCH,RI} = i_{SB\_index,BWP} \cdot N_{PRB,SB} \cdot K + \frac{n_{CCE\_index}}{L_{min}}$$ [Math. 2]

where $n_{PUCCH,RI}$ is located within a PRB given by the formula:

$$PRB_{number} = floor\left(\frac{n_{PUCCH,RI}}{K}\right) = i_{SB\_indexBWP} \cdot N_{PRB,SB} + floor\left(\frac{nCCEindex}{L_{min}K}\right)$$

where $i_{SB\_index,BWP}$ is the sub-band index indicated via RMSI; $N_{PRB,SB}$ is the number of PRBs in each SB; $n_{CCE\_index}$ is the starting CCE index of the detected PDCCH/DCI; K is a number representing the available PUCCH resources (e.g. a total number of Cyclic Shifts and/or Orthogonal Cover Codes) within one PRB; and $L_{min}$ is the minimum aggregation level supported in the search space.

$$k = \frac{n_{CCE\_index}}{L_{min}} \bmod K.$$ [Math. 3]

Alternatively, the PUCCH resource ($n_{PUCCH,RI}$) within a particular PRB may be identified by an index k given by the formula:

Alternatively, the PUCCH resource ($n_{PUCCH,RI}$) within a particular PRB may be identified by an index k signaled separately, for example, in the detected PDCCH DCI. In this case, 2 or 3 bits may be sufficient for signaling the index k, giving K=4 or 8, respectively. This approach may allow the base station 5 to allocate the resource index flexibly (for the PUCCH resource) for example in order to avoid collisions.

For both alternatives described above, the index k (representing the index associated with a particular PUCCH resource within a given PRB) may be mapped to at least one of a Cyclic Shift (CS) and an Orthogonal Cover Code (OCC) by means of a predetermined look-up table and/or the like (known by the mobile device 3 and the base station 5 in advance).

It will be appreciated that other suitable formulas may also be used, and the BWP may be divided into a number of sub-bands where each sub-band contains a set of contiguous PRBs (in order to avoid resource fragmentations). In this case the allocated PUCCH resource may be given within a specific sub-band.

<Mobile Device>

FIG. 2 is a schematic block diagram illustrating the main components of the mobile device 3 shown in FIG. 1 (e.g. a mobile telephone or other user equipment). As shown, the mobile device 3 has a transceiver circuit 31 that is operable to transmit signals to and to receive signals from a base station 5 via one or more antenna 33. The mobile device 3 has a controller 37 to control the operation of the mobile device 3. The controller 37 is associated with a memory 39 and is coupled to the transceiver circuit 31. Although not necessarily required for its operation, the mobile device 3 might of course have all the usual functionality of a conventional mobile telephone 3 (such as a user interface 35) and this may be provided by any one or any combination of hardware, software and firmware, as appropriate. Software may be pre-installed in the memory 39 and/or may be downloaded via the telecommunications network or from a removable data storage device (RMD), for example.

The controller 37 is configured to control overall operation of the mobile device 3 by, in this example, program instructions or software instructions stored within memory 39. As shown, these software instructions include, among other things, an operating system 41, a communications control module 43, and an optional MTC module 45.

The communications control module 43 is operable to control the communication between the mobile device 3 and its serving base station(s) 5 (and other communication devices connected to the base station 5, such as further mobile devices and/or core network nodes). The communications control module 43 also includes (amongst others) a PUCCH and a PUSCH portion for handling uplink communications via associated uplink channels. Although not shown in FIG. 2 for simplicity, the communications control module 43 will also typically include a PDCCH and a PDSCH portion for handling downlink communications via associated downlink channels. The communications control module 43 is responsible for determining the resources to be used by the mobile device 3 and to determine which bandwidth part (sub-band) is allocated for the mobile device 3 (e.g. based on the bandwidth supported by the transceiver circuit 31). Where appropriate, the determination of the appropriate resources to be used by the mobile device 3 may be based on one or more formulas and/or a (predetermined) look-up table. It will be appreciated that the supported operating bandwidth (or current operating bandwidth) of the transceiver circuit 31 may depend on whether the mobile device 3 operates as a conventional UE or as a machine-type device (using its associated MTC module 45).

If present, the MTC module 45 is responsible for performing machine-type communication tasks in accordance with appropriate (e.g. software) instructions.

<Base Station>

FIG. 3 is a schematic block diagram illustrating the main components of a base station 5 shown in FIG. 1. As shown, the base station 5 has a transceiver circuit 51 for transmitting signals to and for receiving signals from the communication devices (such as mobile devices 3/user equipment) via one or more antenna 53 (e.g. an antenna array/massive antenna), and a core network interface 55 (referred to as the 'N2' interface in NR) for transmitting signals to and for receiving signals from network nodes in the core network 7. Although not shown, the base station 5 may also be coupled to other base stations via an appropriate interface (e.g. the so-called 'Xn' interface in NR). The base station 5 has a controller 57 to control the operation of the base station 5. The controller 57 is associated with a memory 59. Software may be pre-installed in the memory 59 and/or may be downloaded via the communications network 1 or from a removable data storage device (RMD), for example. The controller 57 is configured to control the overall operation of the base station 5 by, in this example, program instructions or software instructions stored within memory 59. As shown, these software instructions include, among other things, an operating system 61, a communications control module 63, and a bandwidth part module 65.

The communications control module 63 is operable to control the communication between the base station 5 and mobile devices 3 (user equipment) and other network entities that are connected to the base station 5. The communications control module 63 also controls the separate flows of downlink user traffic (via associated data radio bearers) and control data to be transmitted to communication devices associated with this base station 5 including, for example, control data for determining the appropriate bandwidth part (including a sub-band, if appropriate) to be used by a particular mobile device 3 and the location of one or more resources carrying the (control/data) channels within the associated BWP (e.g. in relation to the BWP and/or sub-band).

The bandwidth part module 65 is responsible for allocating an appropriate BWP (which may include a plurality of sub-bands) for mobile devices 3 served by the base station 5. The bandwidth part module 65 is also responsible for indicating, explicitly and/or implicitly, the appropriate PUCCH resources that a particular mobile device 3 has been allocated (in its BWP).

In the above description, the mobile device 3 and the base station 5 are described for ease of understanding as having a number of discrete modules (such as the communications control modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

<Operation>

As explained above, the base station 5 provides in its cell a number of bandwidth portions which may further include a plurality of sub-bands (and/or the like). A mobile device 3 may be allocated to one of such bandwidth portions based on its capabilities (e.g. based on a current/supported an operational bandwidth of the transceiver circuit 31 of that mobile device 3).

In order to allocate an associated set of PUCCH resources (e.g. within a particular sub-band) to the mobile device 3 (that the mobile device 3 can use even prior to completion of RRC configuration) the base station 5 may be configured to carry out one (or more) of the following methods.

Method 1—Explicit Indication

If the base station 5 is configured to follow this method, a set of (potential) PUCCH resources may be configured for the mobile device 3 explicitly. For example, the base station 5 may be configured to broadcast appropriate information, via e.g. the so-called remaining minimum system information (RMSI) and/or the like, indicating the set of (UE specific) PUCCH resources configured for the mobile device 3. In another example, the base station 5 may be configured to indicate the set of PUCCH resources in an appropriately formatted random access response ('RAR' or 'Msg2' of the random access procedure) when the dedicated resources are unknown to the mobile device 3.

The base station 5 may be further configured to indicate the particular resource (e.g. a single resource from the set of potential PUCCH resources) to be used for PUCCH transmission, using for example an appropriate field in the DCI scheduling of 'Msg4' (the fourth, final message of the random access procedure) and/or any other suitable message received by the mobile device 3 prior to completion of the RRC connection establishment with that base station 5. In this case the base station 5 needs to ensure that the number of PUCCH resources configured for transmitting HARQ-ACK feedback (for Msg4) are large enough to avoid PUCCH blocking (which may occur when multiple mobile devices 3 attempt to perform a random access procedure with the base station 5 substantially concurrently, in which case the set of PUCCH resources may not be sufficient to carry HARQ-ACK feedback from all of these mobile devices 3). This may be achieved for example by over-provisioning the resource although in some cases it may affect spectral efficiency. In order to avoid or reduce radio resource inefficiency and/or PUCCH resource blocking resulting from using pre-configured common PUCCH resources, the DCI for scheduling Msg4 may be configured to include information on the allocated physical resource blocks (PRBs) (for the given UE) and an allocated sequence (e.g. a cyclic shift of a base sequence) for Msg4 HARQ-ACK feedback which would require a limited signaling overhead.

The signaling overhead for explicit indication of a PRB index may also be reduced by employing an appropriate PRB indication technique. For example, the BWP may be divided into a number of virtual sub-bands, each sub-band having a respective associated index value. In the example illustrated in FIG. 5, the BWP is divided into four sub-bands indexed from '0' to '3' (denoted 'SB0' to 'SB3') where each sub-band contains a set of contiguous PRBs (in order to avoid resource fragmentations). In other examples, the number of sub-bands per BWP may be different (e.g. 2, 8, 16, . . . ) as long as the mobile device 3 and the base station 5 are configured to use the same indexing (which may pre-configured or indicated by the base station e.g. via system information broadcast). Although the sub-bands shown in FIG. 5 are of substantially equal size, it will be appreciated that sub-bands of different sizes may also be defined, if appropriate, which may provide additional flexibility.

In the example illustrated in FIG. 5, the specific sub-band (SB) configured for PUCCH transmission by the mobile device 3 may be indicated using two bits in the RMSI (e.g. an appropriate field/information element thereof). It will be appreciated that the PRB index within a particular sub-band (when the sub-band is indicated via RMSI) may be allocated using [x] bits in the DCI scheduling RAR (Msg2) or may be included in the RAR message itself. For example, for the value of $N_{PRB}=100$ (where $N_{PRB}$ denotes the total number of physical resource blocks per sub-band), the maximum number of bits for x (i.e. $x_{max}$) may be derived as $$x_{max} = \log_2\left\lceil\frac{N_{PRB}}{4}\right\rceil = 5.$$

It can be seen therefore that some bits can be saved for PRB indication. However, allocating PUCCH resources near the edge of the sub-band, the value of x need not be equal to $x_{max}$ (since PRB indexing starts from the edges of the sub-band) and PRB signaling overhead can be reduced further. For example, a fixed value of 16 PRBs starting from the most top PRB may be used, as this value may be enough for overall resources that need to be allocated during initial access.

Furthermore, the index of an appropriate initial cyclic shift (CS) may be indicated in DCI scheduling Msg4 using two or three bits. Note that in this case the same PRB may be assigned to multiple UEs configured with different respective cyclic shifts, thereby contributing to improved efficiency of overall resource utilization.

Method 2—Implicit Derivation

It will be appreciated that the base station 5 may configure a set of (potential) PUCCH resources for the mobile device 3 implicitly as well. If the base station 5 is configured to follow this method, the applicable PUCCH resource may be determined by the mobile device 3 without wasting radio resources and without PUCCH resource blocking, whilst also reducing the associated DCI overhead. In more detail, when a cell specific parameter (e.g. $N_{pucch1}$) is broadcast via the RMSI, the PUCCH resource for transmitting HARQ feedback for Msg4 may be derived as $N_{pucch1}+n_{CCE\_index}$ (where $n_{CCE\_index}$ denotes the first index associated with the control channel element (CCE) of the PDCCH that schedules Msg4).

Method 3—a Combination of Explicit and Implicit Indication

The base station 5 may also be configured to perform a combination of explicit indication and implicit determination for dynamically signaling PUCCH resources, which may result in a reduced overhead (compared to other methods). If the base station 5 if configured to follow this method, a particular PUCCH resource may be identified using either one of the following options:

Option 1: The base station 5 may be configured to use a modified version of the LTE design allocating PUCCH resources at the edges of the BWP, in which case the resource index ($n_{PUCCH,RI}$) may be derived as $n_{PUCCH,RI}=N_{pucch1}+n_{CCE\_index}$ where $n_{CCE\_index}$ is the CCE index of the DCI that schedules Msg4. In this example, therefore, the mobile device 3 may transmit HARQ feedback (ACK/NACK) for Msg4 over the resource (PRB) corresponding to the index $n_{PUCCH,RI}$. Beneficially, in order to avoid an overhead associated with the transmission of $N_{pucch1}$, $n_{CCE\_index}$ may be set to zero (or any fixed number) in which case $n_{PUCCH,RI}=n_{CCE\_index}$.

Option 2: Dividing the BWP into four subbands (SBs) may offer flexibility in scheduling PUCCH resources in a frequency region that suffers from lower interference than other regions of the BWP. The index of the particular SB scheduled for PUCCH transmission may be indicated via two bits in the RMSI.

In this case there are two possibilities for deriving the allocated PUCCH resources within a given sub-band:

Option 2a: PUCCH resource indexing for each SB starts from zero. Since the SB index is already known, the allocated PUCCH resource ($n_{PUCCH,RI}$) within the SB can be derived as $n_{PUCCH,RI}=n_{CCE\_index}$.

Option 2b: The allocated PUCCH resource ($n_{PUCCH,RI}$) may be derived as $$n_{PUCCH,RI}=i_{SB\_index,BWP}\cdot N_{PRB,SB}\cdot N_{cyclic\_shifts,PRB}+ n_{CCE\_index}, \qquad [\text{Math. 5}]$$

where $i_{SB\_index,BWP}$ is the index of the SB indicated in the RMSI and $N_{PRB,SB}$ is the number of PRBs per SB. $N_{cyclic\_shifts,PRB}$ is a fixed number of cyclic shifts (e.g. 4, 6, 8, or 12) within a PRB.

For both options 2a and 2b, if $n_{CCE\_index}$ is too large then scheduling of DCI for Msg4 for transmission may be restricted to the first [y] CCEs in order to limit the size of the PUCCH resources for the initial access stage. For example, y may be 24.

Option 3: Both option 1 and option 2 may suffer from resource collision when multiple UEs receiving Msg4 in different DL slots transmit HARQ-feedback in the same resources in an UL slot. This may be avoided by modifying option 2 and deriving the PRB index of the PUCCH resource as $$n_{PRB}=i_{SB,BWP}\cdot N_{PRB,SB}+n_{CEE\_index} \qquad [\text{Math. 6}]$$

(within a particular sub-band indicated via the RMSI).

To avoid PUCCH resource collision among UEs, it is possible to differentiate the UEs based on respective orthogonal sequences by implicitly linking the index of initial cyclic shift to the timing relationship between Msg4 and HARQ-ACK feedback transmission. The timing relation between DCI reception for Msg4 and HARQ-ACK feedback is known to both the base station 5 and the mobile device 3. This timing relation is indexed to determine the cyclic shift according to a pre-defined mapping for HARQ-ACK transmission for the UE. Therefore, PUCCHs transmitted from different mobile devices 3 in the same frequency resource may be differentiated by the base station 5 based on the orthogonal sequences.

In summary, both explicit and implicit mechanisms may be used for determining the appropriate PUCCH resource to be used by a particular mobile device 3. Preferably, a combination of explicit and implicit indication may be used to identify a PUCCH resource for Msg4 HARQ-ACK feedback transmission which may reduce signaling overhead and radio resource waste (compared to other methods). In this case, the allocated PUCCH resource ($n_{PUCCH,RI}$) may be derived using the following formula:

$$n_{PUCCH,RI}=i_{SB\_index,BWP}\cdot N_{PRB,SB}\cdot N_{cyclic\_shifts,PRB}+ n_{CCE\_index}: \qquad [\text{Math. 7}]$$

where $i_{SB\_index,BWP}$ is the sub-band index indicated via RMSI; $N_{PRB,SB}$ is the number of PRBs in each SB: $N_{cyclic\_shifts,PRB}$ is a fixed number of cyclic shifts (e.g. 4, 6, 8, or 12) within a PRB. When appropriate (e.g. if $n_{CEE\_index}$ is too large) the scheduling of DCI for Msg4 for transmission may be restricted to the first [y] CCEs.

In another example, the allocated PUCCH resource ($n_{PUCCH,RI}$) for Msg4 HARQ-ACK feedback transmission may be derived using the formula:

$$\eta_{PUCCH,RI} = i_{SB\_index,BWP}\cdot N_{PRB,SB}\cdot K + \frac{\eta_{CCE\_index}}{L_{min}} \qquad [\text{Math. 8}]$$

where $n_{PUCCH,RI}$ is located within a PRB given by the formula.

$$PRB_{number} = \text{floor}\left(\frac{\eta_{PUCCH,RI}}{K}\right) = i_{SB\_index,BWP} \cdot N_{PRB,SB} + \text{floor}\left(\frac{\eta_{CCE\_index}}{L_{min}K}\right)$$

where $i_{SB\_index,BWP}$ is the sub-band index indicated via $N_{PRB,SB}$; is the number of PRBs in each SB; $n_{CEE\_index}$ is the starting CCE index of the detected PDCCH/DCI; K is a number representing the available PUCCH resources (e.g. a total number of cyclic shifts and/or OCC) within one PRB; and $L_{min}$ is the minimum aggregation level supported in the search space.

Alternatively, the PUCCH resource ($n_{PUCCH,RI}$) within a particular PRB may be identified by an index k given by the formula:

$$k = \frac{n_{CCE,index}}{L_{min}} \bmod K. \quad [\text{Math. 9}]$$

Alternatively, the PUCCH resource ($n_{PUCCH,RI}$) within a particular PRB may be identified by an index k signaled separately, for example, in the detected PDCCH DCI. In this case, 2 or 3 bits may be sufficient for signaling the index k, giving K=4 or 8, respectively. This approach may allow the base station 5 to allocate the resource index flexibly (for the PUCCH resource) for example in order to avoid collisions.

For both alternatives described above, the index k (representing the index associated with a particular PUCCH resource within a given PRB) may be mapped to at least one of a Cyclic Shift (CS) and an Orthogonal Cover Code (OCC) by means of a predetermined look-up table and/or the like (known by the mobile device 3 and the base station 5 in advance).
[Math. 10]

Specifically, in the example shown Table 1 below, the index k is mapped to the value of the associated cyclic shift index ($CS_{index}$). In this case, K is given by the formula K=

$$\frac{12}{\Delta_{PUCCH}},$$

where $\Delta_{PUCCH}=\{2, 3, 4, 6\}$ and $\Delta_{PUCCH}$ is ceil-specific and it is signaled using (e.g. two bits of) the RMSI.

TABLE 1

| k | resource index (k) within a PRB cyclic shift index ($CS_{index}$) |
|---|---|
| 0 | 0 |
| 1 | $\Delta_{PUCCH}$ |
| 2 | $2\Delta_{PUCCH}$ |
| K-1 | (K-1) $\Delta_{PUCCH}$ |

Since CS separation is more effective in relatively low delay spread environments (than OCC) and OCC is more effective at relatively low UE speeds (than CS separation), it may be advantageous to pre-define multiple look-up tables suitable for different cell types. The base station 5 may be configured to signal the look-up table to be used (in a given cell) in the RAR message (Msg2) or using a suitable field (e.g. one bit) of the RMSI. For example, one bit may be sufficient to indicate to the mobile device 3 whether to use the look-up table shown in Table 2 or Table 3 below (although it will be appreciated that more than one bit may be used, if appropriate).

Furthermore, since OCC is not applicable to PUCCH format 0, it may also be advantageous to define different look-up tables for each PUCCH format (see e.g. Tables 3 and 5 for PUCCH format 1 for K=4 and K=8, respectively). It will be appreciated that since the mobile device 3 knows the PUCCH format from the detected PUCCH DCI, it is able to select the appropriate table without requiring additional signaling.

TABLE 2

| | resource index (k) within a PRB for K = 4 in a high delay spread environment (for all PUCCH formats) | |
|---|---|---|
| k | cyclic shift index ($CS_{index}$) | OCC index |
| 0 | 0 | 0 |
| 1 | 3 | 0 |
| 2 | 6 | 0 |
| 0 | 9 | 0 |

TABLE 3

| | resource index (k) within a PRB for K = 4 in a high delay spread environment (for PUCCH format 1) | |
|---|---|---|
| k | cyclic shift index ($CS_{index}$) | OCC index |
| 0 | 0 | 0 |
| 1 | 0 | 1 |
| 2 | 6 | 0 |
| 3 | 6 | 1 |

TABLE 4

| | resource index (k) within a PRB for K = 8 in a high delay spread environment (for all PUCCH formats) | |
|---|---|---|
| k | cyclic shift index ($CS_{index}$) | OCC index |
| 0 | 0 | 0 |
| 1 | 2 | 0 |
| 2 | 4 | 0 |
| 3 | 6 | 0 |
| 4 | 8 | 0 |
| 5 | 9 | 0 |
| 6 | 10 | 0 |
| 7 | 11 | 0 |

TABLE 5

| | resource index (k) within a PRB for K = 8 in a high delay spread environment (for PUCCH format 1) | |
|---|---|---|
| k | cyclic shift index ($CS_{index}$) | OCC index |
| 0 | 0 | 0 |
| 1 | 0 | 1 |
| 2 | 3 | 0 |

TABLE 5-continued resource index (k) within a PRB
for K = 8 in a high delay spread
environment (for PUCCH format 1)

| k | cyclic shift index ($CS_{index}$) | OCC index |
|---|---|---|
| 3 | 3 | 1 |
| 4 | 6 | 0 |
| 5 | 6 | 1 |
| 6 | 9 | 0 |
| 7 | 9 | 1 |

Method 4—Indicating Other Parameters

It will be appreciated that the base station 5 may be configured to indicate a number of other parameters to the mobile device 3, including, but not limited to:

PUCCH format and length: Regardless whether an explicit indication
(method 1) or a combined implicit and explicit indication (method 3) is used, in a small cell configuration (e.g. in case of a home base station), a short PUCCH may suffice for reliable transmission of HARQ-ACK feedback to Msg4. However, a long PUCCH with longer transmission duration may be needed to avoid potential PUCCH coverage limitation. Since the base station 5 knows its cell size, it may be configured to indicate in the DCI scheduling RAR whether long or short PUCCH format is used. Another option is to indicate PUCCH format (long or short) via a bit in the DCI scheduling Msg4 or via RMSI for UEs performing initial access. This may be particularly useful in case if a large (macro) cell wherein mobile devices 3 located at the cell edge may need long PUCCH format whereas mobile devices 3 located close to the centre of the cell (relatively close to the base station 5) may be able to use a short PUCCH. In this case, the base station 5 may be configured to determine (and indicate) the applicable PUCCH format for each mobile device 3 according to, for example, the time elapsed between a RAR transmission (by a particular mobile device 3) and a corresponding successful Msg3 reception (by that mobile device 3), or using information of timing advance (TA).

PUCCH length: A straightforward approach may be to pre-determine the number of symbols which can enable reliable PUCCH decoding for each format according to the numerology of the BWP (that the mobile device 3 has been allocated to).

Frequency resource for the second hop: it may be possible to mirror the resources in frequency domain (within the BWP) for frequency hopping (in a similar manner to the slot hopping employed in LTE). However, the sub-band for second hop may be different (and may be indicated using two bits in the RAR) in order to give more control and flexibility at the base station 5.

An overview of the above described procedures is shown in FIG. 6, which is a signaling (timing) diagram schematically illustrating some of the exemplary ways in which the base station 5 may indicate a set of PUCCH resources and/or a specific PUCCH resource to the mobile device 3.

<Parameters for PUCCH Resource Configuration in RRC Connected UEs>

3GPP agreed on the parameters configured in the PUCCH resource sets, as shown in Table 6 below. Accordingly, for each parameter in Table 6, a set of values can be configured respectively for a set of PUCCH resources. Further, each value can be determined by the UE when a DCI (applicable to that UE) indicates the index of the corresponding PUCCH resource. Alternatively, the values for some parameters may be derived implicitly, e.g. when an appropriate implicit resource indication mechanism is used. An entry in the PUCCH resource set corresponds to one column in Table 6. This resource is defined by some parameters which are the rows of the table.

Note: In Table 6, a parameter with "FFS: special values for implicit derivation" or "FFS if implicit derivation is also used" implies that the responsible 3GPP work group (e.g. RAN1) needs further discussion to determine if implicit and/or explicit methods are used to determine the particular parameter in the entry of PUCCH resource. If an implicit mechanism is used, the corresponding value range may shrink and/or a special value outside the value range may be added for indicating "implicit derivation", or the configurability may be completely disabled. Accordingly, the contents of Table 6 are to be interpreted as examples only.

It will also be appreciated that 3GPP needs to study whether the same or different sets of PUCCH resources shown in Table 6 can be configured for PDSCH mapping type A (slot-based transmission) and type B (non-slot-based transmission).

Table 7 illustrates some examples of semi-statically configured parameters (i.e. an appropriate value may be configured for each parameter of Table 7).

TABLE 6

Parameters configured in PUCCH resource sets and theft value ranges

| | | PUCCH Format 0 | PUCCH Format 1 | PUCCH Format 2 | PUCCH Format 3 | PUCCH Format 4 |
|---|---|---|---|---|---|---|
| FFS: Starting slot | Configurability | FFS | FFS | FFS | FFS | FFS |
| | Value range | 0-[x] | 0-[x] | 0-[x] | 0-[x] | 0-[x] |
| Starting symbol | Configurability | √ | √ | √ | √ | √ |
| | Value range | 0-13 | 0-10 | 0-13 | 0-10 | 0-10 |
| Number of symbols in a slot | Configurability | √ | √ | √ | √ | √ |
| | Value range | 1, 2 | 4-14 | 1, 2 | 4-14 | 4-14 |
| Index for identifying starting PRB | Configurability | √ | √ | √ | √ | √ |
| | Value range | 0-274 | 0-274 | 0-274 | 0-274 | 0-274 |
| Number of PRBs | Configurability | N.A. | N.A. | √ | √ | N.A. |
| | Value range | N.A. | N.A. | 1-16 (Default is 1) | 1-6, 8-10, 12, 15, 16 | N.A. (Default is 1) |

TABLE 6-continued

Parameters configured in PUCCH resource sets and theft value ranges

| | | PUCCH Format 0 | PUCCH Format 1 | PUCCH Format 2 | PUCCH Format 3 | PUCCH Format 4 |
|---|---|---|---|---|---|---|
| Enabling a frequency hopping | Configurability Value range | √ On/Off (only for 2 symbol) | √ On/Off | √ On/Off (only for 2 symbol) | √ On/Off | √ On/Off |
| Frequency resource of $2^{nd}$ hop if frequency Hopping is enabled | Configurbility Value range | √ 0-274 | √ 0-274 | √ 0-274 | √ 0-274 | √ 0-274 |
| index of initial cyclic shift | Configurability Value range | √ 0-11 | √ 0-11 | N.A. N.A. | √ 0-11 | N.A. 0-11 |
| Index of time-domain OCC | Configurability Value range | N.A. N.A. | √ 0-6 | N.A. N.A. | N.A. N.A. | N.A. N.A. |
| Length of Pre-DFT OCC | Configurability Value range | N.A. N.A. | N.A. N.A. | N.A. N.A. | N.A. N.A. | √ 2, 4 |
| Index of Pre-OFT OCC | Configurability Value range | N.A. N.A. | N.A. N.A. | N.A. N.A. | N.A. N.A. | √ 0, 1, 2, 3 |

TABLE 7

Semi-statically-configured parameters and their vaue ranges

| | | PUCCH Format 0 | PUCCH Format 1 | PUCCH Format 2 | PUCCH Format 3 | PUCCH Format 4 |
|---|---|---|---|---|---|---|
| Number of slots | Configurability Value range | N.A. N.A. | Configured 1, y1, y2, y3 | N.A. N.A. | Configured 1, y1, y2, y3 | Configured 1, y1, y2, y3 |

<Modifications and Alternatives>

Detailed example embodiments have been described above. As those skilled in the art will appreciate, a number of modifications and alternatives can be made to the above example embodiments whilst still benefiting from the inventions embodied therein. By way of illustration only a number of these alternatives and modifications will now be described.

A number of exemplary look-up tables have been presented above (in Tables 1 to 5). However, it will be appreciated that other suitable look-up tables may also be used in which case the value of k may be derived using different values of $CS_{index}$ and/or OCC index. It will also be appreciated that the value of k may be derived based on any suitable parameter (e.g. a parameter other than $CS_{index}$ and OCC index) where appropriate.

It will be appreciated that the look-up table(s) may be factory configured and/or operator specific, in which case it may not be necessary to signal them to the mobile device 3 (e.g. the mobile device 3 may be configured to select the appropriate look-up table based on its current operator and/or cell).

In the above example embodiments, the base station uses a 3GPP radio communications (radio access) technology to communicate with the mobile device. However, any other radio communications technology (i.e. WLAN, Wi-Fi, WiMAX, Bluetooth, etc.) can be used between the base station and the mobile device in accordance with the above example embodiments. The above example embodiments are also applicable to 'non-mobile' or generally stationary user equipment.

In the above description, the mobile device and the base station are described for ease of understanding as having a number of discrete functional components or modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

In the above example embodiments, a number of software modules were described. As those skilled in the art will appreciate, the software modules may be provided in compiled or un-compiled form and may be supplied to the base station, to the mobility management entity, or to the mobile device as a signal over a computer network, or on a recording medium. Further, the functionality performed by part or all of this software may be performed using one or more dedicated hardware circuits. However, the use of software modules is preferred as it facilitates the updating of the base station or the mobile device in order to update their functionalities.

Each controller may include any suitable form of processing circuitry including (but not limited to), for example:

one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

The above mentioned random access procedure may be a procedure for establishing an RRC connection.

The obtaining of said first information may also include receiving at least part of said first information as part of system information broadcast before initiation of said random access procedure (e.g. from a remaining minimum system information (RMSI) portion of the system information). The obtaining of said first information may include receiving at least part of said first information after initiation of said random access procedure (e.g. in a second message ('Msg2')/random access response (RAR) of the random access procedure). The obtaining of said second information may include receiving at least part of said second information as part of said random access procedure (e.g. in a fourth message ('Msg4') of the random access procedure).

The first information may include information identifying a sub-band (e.g. a sub-band within a bandwidth part) of a system bandwidth of the base station; and the second information may include information identifying a specific frequency resource (e.g. at least one PRB) within the sub-band identified by the first information (e.g. at least one PRB within the sub-band with respect to a PRB representing an edge of the sub-band).

The set of frequency resources may include a set of physical resource blocks (PRBs) (e.g. a set of contiguous PRBs forming part of a system bandwidth of the base station) and said specific frequency resource may include a specific PRB.

The channel may include a Physical Uplink Control Channel (PUCCH). The uplink communication may include transmitting Hybrid Automatic Repeat Request (HARQ) feedback to the base station (e.g. HARQ feedback for a fourth message ('Msg4') of the random access procedure).

The at least one specific frequency resource is identified using at least one formula. For example, the at least one specific frequency resource may be identified using at least one of:

a) the formula $$n_{PUCCH,RI} = i_{SB\_index,BWP} \cdot N_{PRB,SB} \cdot N_{cyclic\_shifts,PRB} + n_{CCE\_index};$$ [Math. 11]

where $n_{PUCCH,RI}$ is an index associated with a PUCCH resource, representing said at least one specific frequency resource, for said uplink communication (e.g. HARQ feedback for Msg4), $i_{SB\_index,BWP}$ is an index, forming at least part of said first information (e.g. indicated via RMSI), of a sub band within the bandwidth part, $N_{PRB,SB}$ is a total number of PRBs per sub-band; $N_{cyclic\_shifts,PRB}$ is a fixed number of cyclic shifts (e.g. 4, 6, 8, or 12) within a PRB; and $n_{CCE\_index}$ is an index, forming at least part of said second information, associated with a control channel element (CCE);

b) the formula [Math. 12]

$$n_{PUCCH,RI} = i_{SB\_index,BWP} \cdot N_{PRB,SB} \cdot K + \frac{n_{CCE\_index}}{L_{min}};$$

where $n_{PUCCH,RI}$ is an index associated with a PUCCH resource, representing said at least one specific frequency resource, for said uplink communication (e.g. HARQ feedback for Msg4); $i_{SB\_index,BWP}$ is an index, forming at least part of said first information (e.g. indicated via RMSI), of a sub-band within the bandwidth part: $N_{PRB,SB}$ is a total number of PRBs per sub-band; $n_{CEE\_index}$ is an index, forming at least part of said second information, associated with a CCE; K is a number representing a number of available PUCCH resources (e.g. a total number of Cyclic Shifts and/or Orthogonal Cover Codes) per PRB; and $L_{min}$ is a parameter representing a minimum aggregation level supported in the search space; and c) the formula $$n_{PUCCH,RI} = N\text{pucch}1 + n_{CCE\_index};$$ [Math. 13]

where $n_{PUCCH,RI}$ is an index associated with a PUCCH resource, representing said at least one specific frequency resource, for said uplink communication (e.g. HARQ feedback for Msg4); Npucch1 is a cell specific parameter forming at least part of said first information (e.g. broadcast via the RMSI); and $n_{CCE\_index}$ is an index, forming at feast part of said second information, associated with a CCE (e.g. a first CCE of a Downlink Control Information (DCI) that schedules the fourth message ('Msg4') of the random access procedure), The method may further include obtaining third information identifying whether a short or a long PUCCH format is being used. The third information (e.g. one bit) may be included in the DCI that schedules Msg4 or in the RMSI.

Various other modifications will be apparent to those skilled in the art and will not be described in further detail here.

The following is a detailed description of the ways in which the above described example embodiments may be implemented in the currently proposed 3GPP standards. Whilst various features are described as being essential or necessary, this may only be the case for the proposed 3GPP standard, for example due to other requirements imposed by the standard. These statements should not, therefore, be construed as limiting the present invention in any way.

<1> Introduction

In the last meeting, RAN1 discussed the PUCCH resource allocation before RRC connection set-up/initial access, with the following agreements:

Agreements: (RAN1 #91)
For resource allocation for HARQ-ACK before RRC connection setup:
Only PUCCH Format 0 and 1 are supported
The resource allocation is derived based on a 4-bit parameter in RMSI
FFS other details (no additional RRC impact)

Agreements:
For PUCCH resource allocation with fallback DCI,
The same approach is used as that with normal DCI.

Agreements:
For resource allocation for HARQ-ACK before RRC connection setup, UE identifies a PUCCH resource from a set of resources derived from RMSI using a similar approach to the case after RRC connection setup.

In this contribution, we discuss how to design and allocate PUCCH resources for Msg4 HARQ-ACK feedback transmission during the initial access/before RRC connection set-up.

<2> PUCCH Resource Allocation Prior to RRC Configuration

Before RRC configuration, it is necessary that most of the parameters that determine the PUCCH resource allocation to be fixed in the specification except for few parameters that may be signaled either in the DCI format or RMSI. Based on this understanding, we propose to predefine PUCCH formats and their transmission parameters as captured in Table 8.

TABLE 8

PUCCH formats with predefined parameters

| PUCCH format indicator | Number of symbols | Starting symbol | Frequency resource | Hopping | CS index | Time-domain OCC |
|---|---|---|---|---|---|---|
| Format 0-1symbol | 1 | 13 | PRB is given by an equation | NA | Between 0-11, but to be selected by the proposed equation or signaled by the DCI | NA |
| Format 0-2symbol | 2 | 12 | PRB is given by an equation | Always Hop (Mirroring) | Between 0-11, but to be selected by the proposed equation or signaled by the DCI | NA |
| Format 1 | 10 | 4 | PRB is given by an equation | Always hop (Mirroring) | Between 0-11, but to be selected by the proposed equation or signaled by the DCI | Between 0-1, but to be selected by the proposed table. |
| Format 1 | 14 | 0 | PRB is given by an equation | Always hop (Mirroring) | Between 0-11, but to be selected by the proposed equation or signaled by the DCI | Between 0-1, but to be selected by the proposed table. |

The PUCCH format is one of {Format 0-(symbol, Format 0-2 symbol, Format 1-10 symbol, Format 1-14 symbol} and can be dynamically signaled in the DCI scheduling MSG4 or in the RAR message (MSG2). In this case 2-bits should be enough.

Proposal 1: Predefine four PUCCH formats {Format 0-1 symbol, Format 0-2 symbol, Format 1-10 symbol, Format 1-14 symbol} for initial access where one of the formats is signaled dynamically in the DCI scheduling MSG4 or in the RAR message (MSG2).

Proposal 2: Predefine and fix the value of the transmission parameters such as number of symbols, starting symbol, and hopping resource for each PUCCH format.

Proposal 3: Define an equation or method how to obtain the first frequency resource (PRB number), CS index and time-domain OCC for each PUCCH format.

For defining PUCCH resources for the initial access, it is important to include an offset in order to locate the PUCCH resource away from the edges of the bandwidth part (BWP) if needed, for example when the edges of the BWP suffer from high level of interference. From last meeting, it is agreed that 4-bits shall be used for deriving the PUCCH resources during initial access, therefore we propose only 2-bits of 4 bits are used for signaling the offset in cell specific manner and the remaining two bits can be either reserved or used for other purpose. In this case, the BWP is divided into 4 virtual sub-bands indexed from 0 to 3 as shown in FIG. 5 where each sub-band contains contiguous PRBs to avoid resource fragmentations. This offers flexibility to start the PUCCH resources in a frequency region that suffers from lower interference than other regions of the BWP.

Based on the above description, we propose the following equation for PUCCH resource allocation for Msg4 HARQ-ACK feedback transmission:

$$n_{PUCCH,RI} = i_{SB\_index,BWP} \cdot N_{PRB,SB} \cdot K + \frac{nCCEindex}{L_{min}} \quad [\text{Math. 14}]$$

located within:

$$PRB_{number} =$$
$$\text{floor}\left(\frac{n_{PUCCH,RI}}{K}\right) = i_{SB\_indexBWP} \cdot N_{PRB,SB} + \text{floor}\left(\frac{nCCEindex}{L_{min}K}\right)$$

where $i_{SB\_index,BWP}$ is the index of SB indicated in RMSI, $N_{PRB,SB}$ is the number of PRBs in each SB, nCCEindex is the starting CCE index of the detected PDCCH/DCI, K is the number of available PUCCH resources (cyclic shifts and/or OCC) within one PRB, and $L_{min}$ is the minimum aggregation level supported in the search space.

The main reason of adding the parameter $L_{min}$ in to the equation is to increase the density of the usable PUCCH resources within a PRB as the higher aggregation level tends to decrease the density of the usage.

[Math. 15]

The number of available PUCCH resources within one PRB can be determined by at least two different alternatives as follows:

Alt-1: The PUCCH resource within one PRB is identified by an index k given by $$k = \frac{nCCEindex}{L_{min}} \bmod K,$$

and the parameter K is given by $$K = \frac{12}{\Delta_{PUCCH}},$$

where $\Delta_{pucch}=\{2,3,4,6\}$ is a cell-specific and signaled using the remaining two bits in the RMSI, and k is mapped to CS index as shown in Table 1.

The main concern of Alt-1 is that gNB does not have a scheduling flexibility to change the PUCCH resource index because the cyclic shift is implicitly derived from the equation itself.

Alt-2: The PUCCH resource within one PRB is identified by an index k which is signaled in the detected PDCCH DCI, and 2 or 3 bits should be sufficient for this, giving K=4 or 8 respectively.

The merit of Alt-2 is that it allows gNB to allocate resource index flexibility, for example in order to avoid collisions for different UEs Ack/Nack feedbacks.

For both Alt-1 and Alt-2, the resource index within one PRB, k can be mapped to a cyclic shift (CS) and Orthogonal Cover Code (OCC) by means of a pre-determined look-up-table.

Since CS separation is more effective in low delay spread environments and OCC is more effective at low UE speed, it may be advantageous to pre-define multiple look-up-tables suitable for different cell types. The look-up-table to be used in each cell could be signaled in the RAR message (MSG2) or in the RMSI using 1-bit of the remaining two bits.

Proposal 4: Define PUCCH resource for Msg4 HARQ-ACK feedback transmission as given by the following equation:

$$n_{PUCCH,RI} = i_{SB\_index,BWP} \cdot N_{PRB,SB} \cdot K + \frac{nCCEindex}{L_{min}} \quad [\text{Math. 16}]$$

located within:

$$PRB_{number} =$$

$$\text{floor}\left(\frac{n_{PUCCH,RI}}{K}\right) = i_{SB\_index,BWP} \cdot N_{PRB,SB} + \text{floor}\left(\frac{nCCEindex}{L_{min}K}\right)$$

where $i_{SB\_index,BWP}$ is the index of SB indicated in RMSI, $N_{PRB,SB}$ is the number of PRBs in each SB, nCCEindex is the starting CCE index of the detected DCI, K is the number of available PUCCH resources (cyclic shifts and/or OCC) within one PRB for example K=4 where its index k is signaled by 2-bits in the detected DCI (as captured in Table 3 and 4), and $L_{min}$ is the minimum aggregation level supported in the search space.

Proposal 5: Define two different look-up-tables for PUCCH format 1 for the combination of CS and OCC and signal in the RMSI using 1-bit of the remaining two bits.

<3> Conclusions

In this contribution, we discussed how to design and allocate PUCCH resources for Msg4 HARQ-ACK feedback transmission during the initial access/before RRC connection set-up, and we have the following proposals.

Proposal 1: Predefine four PUCCH formats {Format 0-1 symbol, Format 0-2 symbol, Format 1-10 symbol, Format 1-14 symbol} for initial access where one of the formats is signaled dynamically in the DCI scheduling MSG4 or in the RAR message (MSG2).

Proposal 2: Predefine and fix the value of the transmission parameters such as number of symbols, starting symbol, and hopping resource for each PUCCH format.

Proposal 3: Define an equation or method how to obtain the first frequency resource (PRB number), CS index and time-domain OCC for each PUCCH format.

Proposal 4: Define PUCCH resource for Msg4 HARQ-ACK feedback transmission as given by the following equation:

$$n_{PUCCH,RI} = i_{SB\_index,BWP} \cdot N_{PRB,SB} \cdot K + \frac{nCCEindex}{L_{min}} \quad [\text{Math. 17}]$$

located within:

$$PRB_{number} =$$

$$\text{floor}\left(\frac{n_{PUCCH,RI}}{K}\right) = i_{SB\_index,BWP} \cdot N_{PRB,SB} + \text{floor}\left(\frac{nCCEindex}{L_{min}K}\right)$$

where $i_{SB\_index,BWP}$ is the index of SB indicated in RMSI, $N_{PRB,SB}$ is the number of PRBs in each SB, nCCEindex is the starting CCE index of the detected DCI, K is the number of available PUCCH resources (cyclic shifts and/or OCC) within one PRB for example K=4 where its index k is signaled by 2-bits in the detected DCI (as captured in Table 3 and 4), and is the minimum aggregation level supported in the search space.

Proposal 5: Define two different look-up-tables for PUCCH format 1 for the combination of CS and OCC and signal in the RMSI using 1-bit of the remaining two bits.

Some of or all the above-described example embodiments can be described as in the following Supplementary Notes, but are not limited to the following.

(Supplementary Note 1)

A method performed by user equipment (UE) of identifying a frequency resource for an uplink communication, the method comprising:

initiating a random access procedure;

obtaining first information identifying a set of frequency resources for an uplink channel; obtaining second information identifying at least one specific frequency resource, within said set of frequency resources, for said uplink communication; and identifying based on said first information and said second information said frequency resource for said uplink communication;

wherein said first information is obtained prior to completion of the random access procedure.

(Supplementary Note 2)
The method according to supplementary note 1, wherein said random access procedure is a procedure for establishing an RRC connection.

(Supplementary Note 3)
The method according to supplementary note 1 or 2, wherein said obtaining of said first information comprises receiving at least part of said first information as part of system information broadcast before initiation of said random access procedure (e.g. from a remaining minimum system information (RMSI) portion of the system information).

(Supplementary Note 4)
The method according to any of supplementary notes 1 to 3, wherein said obtaining of said first information comprises receiving at least part of said first information after initiation of said random access procedure (e.g. in a second message ('Msg2')/random access response (RAR) of the random access procedure).

(Supplementary Note 5)
The method according to any of supplementary notes 1 to 4, wherein said obtaining of said second information comprises receiving at least part of said second information as part of said random access procedure (e.g. in a fourth message ('Msg4') of the random access procedure).

(Supplementary Note 6)
The method according to any of supplementary notes 1 to 5, wherein said set of frequency resources comprises a set of physical resource blocks (PRBs) (e.g. a set of contiguous PRBs forming part of a system bandwidth of the base station) and wherein said specific frequency resource comprises a specific PRB.

(Supplementary Note 7)
The method according to any of supplementary notes 1 to 6, wherein:
said first information comprises information identifying a sub-band (e.g. a sub-band within a bandwidth part) of a system bandwidth of the base station; and
wherein said second information comprises information identifying a specific frequency resource (e.g. at least one PRB) within the sub-band identified by the first information (e.g. at least one PRB within the sub-band with respect to a PRB representing an edge of the sub-band).

(Supplementary Note 8)
The method according to any of supplementary notes 1 to 7, wherein said uplink communication comprises transmitting Hybrid Automatic Repeat Request (HARQ) feedback to the base station (e.g. HARQ feedback for a fourth message ('Msg4') of the random access procedure).

(Supplementary Note 9)
The method according to any of supplementary notes 1 to 8, wherein said at least one specific frequency resource is identified using at least one formula.

(Supplementary Note 10)
The method according to any of supplementary notes 1 to 9, wherein said channel comprises a Physical Uplink Control Channel (PUCCH).

(Supplementary Note 11)
The method according to supplementary note 10, wherein said at least one specific frequency resource is identified using at least one of:
a) the formula $$n_{PUCCH,RI} = i_{SB\_index,BWP} \cdot N_{PRB,SB} \cdot N_{cyclic\_shifts,PRB} + n_{CCE\_index}; \quad [\text{Math. 18}]$$

where $n_{PUCCH,RI}$ is an index associated with a PUCCH resource, representing said at least one specific frequency resource, for said uplink communication (e.g. HARQ feedback for Msg4): $i_{SB\_index,BWP}$ is an index, forming at least part of said first information (e.g. indicated via RMSI), of a sub-band within the bandwidth part; $N_{PRB,SB}$ is a total number of PRBs per sub-band; $N_{cyclic\_shifts,PRB}$ is a fixed number of cyclic shifts (e.g. 4, 6, 8, or 12) within a PRB; and $n_{CCE\_index}$ is an index, forming at least part of said second information, associated with a control channel element (CCE)

b) the formula $$n_{PUCCH,RI} = i_{SB\_index,BWP} \cdot N_{PRB,SB} \cdot K + \frac{n_{CCE\_index}}{L_{min}}; \quad [\text{Math. 19}]$$

where $n_{PUCCH,RI}$ is an index associated with a PUCCH resource, representing said at least one specific frequency resource, for said uplink communication (e.g. HARQ feedback for Msg4); $i_{SB\_index,BWP}$ is an index, forming at least part of said first information (e.g. indicated via RMSI), of a sub-band within the bandwidth part; $N_{PRB,SB}$ is a total number of PRBs per sub-band; $n_{CCE\_index}$ is an index, forming at least part of said second information, associated with a CCE; K is a number representing a number of available PUCCH resources (e.g. a total number of Cyclic Shifts and/or Orthogonal Cover Codes) per PRB; and $L_{min}$ is a parameter representing a minimum aggregation level supported in the search space; and c) the formula $$n_{PUCCH,RI} = N\text{pucch1} + n_{CCE\_index}: \quad [\text{Math. 20}]$$

where $n_{PUCCH,RI}$ is an index associated with a PUCCH resource, representing said at least one specific frequency resource, for said uplink communication (e.g. HARQ feedback for Msg4); Npucch1 is a cell specific parameter forming at least part of said first information (e.g. broadcast via the RMSI); and $n_{CCE\_index}$ is an index, forming at least part of said second information, associated with a CCE (e.g. a first CCE of a Downlink Control Information (DCI) that schedules the fourth message ('Msg4') of the random access procedure).

(Supplementary Note 12)
The method according to supplementary note 10 or 11, further comprising obtaining third information identifying whether a short or a long PUCCH format is being used.

(Supplementary Note 13)
The method according to supplementary note 12, wherein said third information (e.g. one bit) is included in the DCI that schedules Msg4 or in the RMSI.

(Supplementary Note 14)
A method performed by a base station of identifying a frequency resource for an uplink communication by user equipment, the method comprising:
initiating a random access procedure with the user equipment;
providing first information identifying a set of frequency resources for an uplink channel; and
providing second information identifying at least one specific frequency resource, within said set of frequency resources, for said uplink communication;
wherein said first information is provided prior to completion of the random access procedure.

(Supplementary Note 15)

The method according to supplementary note 14, wherein said random access procedure is a procedure for establishing an RRC connection.

(Supplementary Note 16)

The method according to supplementary note 14 or 15, wherein said providing first information comprises transmitting at least part of said first information as part of system information broadcast before initiation of said random access procedure (e.g. in a remaining minimum system information (RMSI) portion of the system information.

(Supplementary Note 17)

The method according to any of supplementary notes 14 to 16, comprising transmitting, after initiation of said random access procedure, at least one message comprising at least one of said first information and said second information.

(Supplementary Note 18)

The method according to any of supplementary notes 14 to 17, wherein said channel comprises a Physical Uplink Control Channel (PUCCH) and wherein said specific resource is identified using at least one formula.

(Supplementary Note 19)

User equipment (UE) for a communication system, the communication device comprising: a controller and a transceiver; wherein the controller is operable to:
 initiate a random access procedure;
 obtain first information identifying a set of frequency resources for an uplink channel;
 obtain second information identifying at least one specific frequency resource, within said set of frequency resources, for said uplink communication; and
 identify based on said first information and said second information said frequency resource for said uplink communication;
 wherein said first information is obtained prior to completion of the random access procedure.

(Supplementary Note 20)

A base station for identifying a frequency resource for an uplink communication by user equipment, the base station comprising:
 a controller and a transceiver, wherein the controller is operable to:
  initiate a random access procedure with the user equipment;
  provide first information identifying a set of frequency resources for an uplink channel; and
  provide second information identifying at least one specific frequency resource, within said set of frequency resources, for said uplink communication;
 wherein said first information is provided prior to completion of the random access procedure.

(Supplementary Note 21)

A system comprising: the user equipment (UE) according to supplementary note 19 and the base station according to supplementary note 20.

(Supplementary Note 22)

A computer implementable instructions product comprising computer implementable instructions for causing a programmable communications device to perform the method of any of supplementary notes 1 to 18.

This application is based upon and claims the benefit of priority from United Kingdom Patent Application No. 1718999.4, filed on Nov. 16, 2017 and No. 1800393.9, filed on Jan. 10, 2018 the disclosure of which are incorporated herein in their entirety by reference.

The invention claimed is:

1. A method performed by a user equipment (UE), the method comprising:
 receiving, from a base station, a remaining minimum system information (RMSI) including first information identifying a set of a Physical Uplink Control Channel (PUCCH) format, a first symbol and a Cyclic Shift (CS) index related information;
 receiving, from the base station, second information identifying at least one PUCCH resource in a downlink control information (DCI); and
 determining, based on the CS index related information and based on the second information, a physical resource block (PRB) index.

2. The method according to claim 1, wherein the receiving the RMSI is performed before the UE is configured with a dedicated PUCCH resource.

3. The method according to claim 1, wherein the first information identifies a number of symbols.

4. A method performed by a base station, the method comprising:
 transmitting, to a user equipment (UE), a remaining minimum system information (RMSI) including first information identifying a set of a Physical Uplink Control Channel (PUCCH) format, a first symbol and a Cyclic Shift (CS) index related information; and
 transmitting, to the UE, second information identifying at least one PUCCH resource in a downlink control information (DCI).

5. The method according to claim 4, wherein the transmitting the RMSI is performed before the UE is configured with a dedicated PUCCH resource.

6. The method according to claim 4, wherein the first information identifies a number of symbols.

7. A user equipment, UE, (3) for a communication system (1), the UE (3) comprising:
 a controller (37) and a transceiver (31); wherein the controller (37) is configured to:
  receive, from a base station (5), a remaining minimum system information, RMSI, including first information identifying a set of a Physical Uplink Control Channel, PUCCH, format, a first symbol and a Cyclic Shift, CS, index related information;
  receive, from the base station (5), second information identifying at least one PUCCH resource in a downlink control information, DCI; and
  determine, based on the CS index related information and based on the second information, physical resource block, PRB, index.

8. A base station comprising:
 a controller and a transceiver, wherein the controller is configured to:
  transmit, to a user equipment (UE), a remaining minimum system information (RMSI) including first information identifying a set of a Physical Uplink Control Channel (PUCCH) format, a first symbol and a Cyclic Shift (CS) index related information; and
  transmit, to the UE, second information identifying at least one PUCCH resource in a downlink control information (DCI).

* * * * *